US007793802B2

(12) United States Patent
Knox et al.

(10) Patent No.: US 7,793,802 B2
(45) Date of Patent: Sep. 14, 2010

(54) FASTENER FOR A VISCOUS MATERIAL CONTAINER EVACUATOR AND METHOD

(75) Inventors: Roger Knox, Clifton Park, NY (US); Jennifer L. Stanton, Clifton Park, NY (US); Harry A. Bayly, Mechanicville, NY (US)

(73) Assignee: Momentive Performance Materials, Albany, NY (US)

( * ) Notice: Subject to any disclaimer, the term of this patent is extended or adjusted under 35 U.S.C. 154(b) by 859 days.

(21) Appl. No.: 11/536,826

(22) Filed: Sep. 29, 2006

(65) Prior Publication Data

US 2008/0067198 A1 Mar. 20, 2008

Related U.S. Application Data

(63) Continuation-in-part of application No. 11/532,334, filed on Sep. 15, 2006.

(51) Int. Cl.
*G01F 11/00* (2006.01)
*B67D 7/64* (2010.01)
*B23Q 3/08* (2006.01)

(52) U.S. Cl. ....................... 222/183; 222/326; 222/289; 269/27; 269/32; 248/146

(58) Field of Classification Search ................. 222/183, 222/326, 327, 389; 269/24, 27, 32; 29/281.1; 248/142, 146, 149
See application file for complete search history.

(56) References Cited

U.S. PATENT DOCUMENTS 2,105,990 A * 1/1938 Pelouch ...................... 222/325
2,922,360 A * 1/1960 Monk, Jr. ................ 100/229 R
3,113,705 A * 12/1963 Weitzel ...................... 222/389
3,546,430 A * 12/1970 Kane .......................... 392/448
3,637,111 A * 1/1972 McCreary ................ 222/146.2
3,731,616 A * 5/1973 Ligh .......................... 100/126
4,067,483 A 1/1978 Mucke
4,071,168 A 1/1978 Stone
4,154,044 A 5/1979 Lang
4,166,221 A 8/1979 McGaha
4,221,102 A 9/1980 Lang
4,284,597 A 8/1981 Stein (Continued)

FOREIGN PATENT DOCUMENTS

FR 1530480 6/1968

*Primary Examiner*—Kenneth Bomberg
(74) *Attorney, Agent, or Firm*—Philip D. Freedman PC; Philip D. Freeedman; Kenneth S. Wheelock

(57) ABSTRACT

A viscous material container evacuator comprises a chamber to hold a container and a plunger axially and slidably accommodated within the chamber to express material from the container; and at least one hinged closure that closes to define the chamber and to securely enclose the container; and at least one motor activated fastener that secures the closure around the container. A method to secure a closure of a viscous material container evacuator, comprises activating a motor drive shaft to drive a connected threaded shaft into a complimentary threaded channel of a clamp block that comprises an opposing nub wall; and driving the threaded shaft to impose upon a first lug of an evacuator and to foreshorten a distance between a head of the threaded shaft and the opposing nub to impose the nub against a second lug of a closure to secure the lugs together to secure the container.

14 Claims, 12 Drawing Sheets

U.S. PATENT DOCUMENTS 4,285,643 A 8/1981 White
4,402,428 A 9/1983 Lang
4,448,272 A 5/1984 Keller et al.
4,448,736 A 5/1984 Emery et al.
4,534,493 A * 8/1985 Sedran ....................... 222/259
4,539,864 A 9/1985 Wiebe
4,548,446 A 10/1985 Warshawsky
4,559,870 A * 12/1985 Krummacher et al. ...... 100/215
4,693,397 A 9/1987 Lang
4,874,022 A 10/1989 Schwerdtel
4,955,769 A 9/1990 Crankshaw
4,986,717 A 1/1991 Cummins
5,078,304 A 1/1992 Schneider
5,105,736 A * 4/1992 Morris ....................... 100/345
5,137,368 A 8/1992 Kistner
5,335,185 A 8/1994 Pitts et al.
5,360,146 A 11/1994 Ikushima
5,361,692 A * 11/1994 Zimmer .................. 100/229 A
5,377,815 A 1/1995 Vetter
5,417,169 A 5/1995 Carpenter
5,460,209 A 10/1995 Jandur et al.
5,671,873 A 9/1997 Hammerl
5,797,516 A 8/1998 Brandl
5,846,042 A 12/1998 Iannuzzi
5,851,049 A 12/1998 Squire
5,941,539 A 8/1999 Pratt
6,035,957 A 3/2000 Place
6,061,608 A 5/2000 Moldavsky
6,155,808 A 12/2000 White
6,211,267 B1 4/2001 Suto
6,250,123 B1 6/2001 Killop
6,348,001 B2 2/2002 Killop
6,391,234 B1 5/2002 Silvi
6,414,054 B1 7/2002 Boffard
6,444,154 B1 9/2002 Boudreau
6,474,971 B1 11/2002 Dong
6,524,191 B1 2/2003 Tennies
6,572,253 B2 6/2003 Silvi
6,592,000 B1 7/2003 Owens et al.
6,604,559 B2 8/2003 Rubin
6,619,898 B1 9/2003 Cosenza
6,682,105 B2 1/2004 Latham
6,749,786 B2 6/2004 Boudreau
6,789,302 B1 9/2004 Preta
6,951,101 B2 10/2005 Nitsche
7,032,499 B2 4/2006 Domann
7,089,818 B2 8/2006 Daigre
2002/0039523 A1 4/2002 Hartmann
2003/0185647 A1 10/2003 Cosenza
2005/0173137 A1 8/2005 Buchl
2005/0241774 A1 11/2005 Hart
2006/0110237 A1 5/2006 Belinda

* cited by examiner

FIG. 13
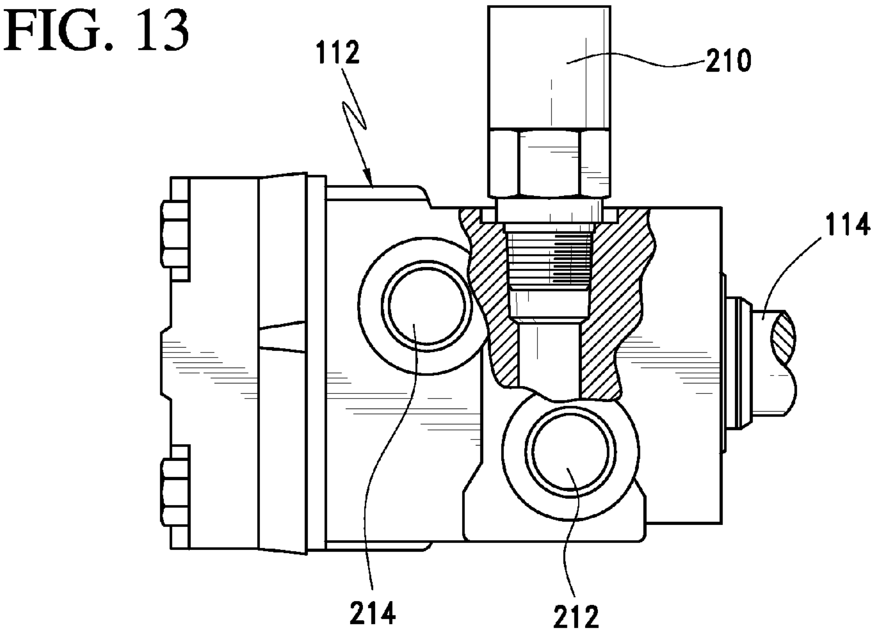
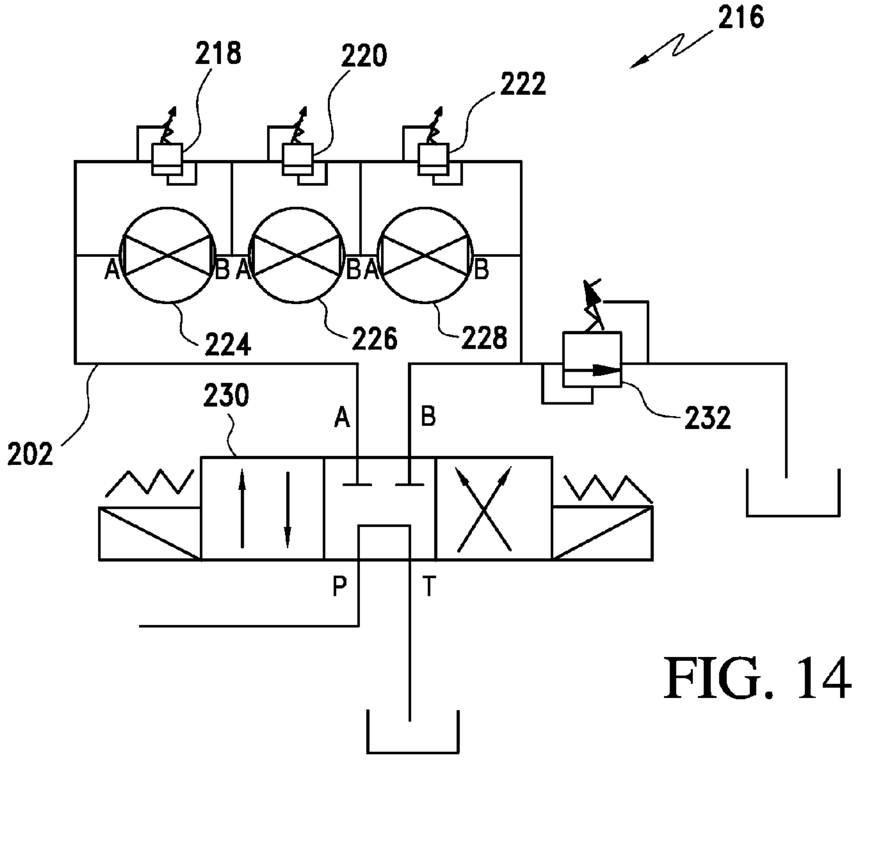
FIG. 14

FASTENER FOR A VISCOUS MATERIAL CONTAINER EVACUATOR AND METHOD

This application is a continuation in part of Stanton et al., Viscous Material Feed System and Method, Ser. No. 11/532,334, filed 15 Sep. 2006.

BACKGROUND OF THE INVENTION

The invention relates to a fastener for a container evacuator and a method, in particular for a drum evacuator for pressing silicone gum or other viscous material from a container to a continuous compounding system.

In a compounding system, a viscous material is fed to a processing line where feed is mixed and additives are injected in proportions to produce a customized product. The feed material for these processes can be delivered in various containers to the compounding site. When delivered, the material must be removed from the container for processing. For example, a compounding system can require emptying material such as silicone gum from drums or similar containers. However, the feed material may be very viscous and resistant to flow and hence, resistant to removal from the delivery container.

Some emptying processes use a plunger to drive through a container content to express the content for further processing. A considerable amount of pressure is needed in these processes to express a viscous material such as a silicone gum. The high expressing force exposes the materials container to very high mechanical stress. For reasons of weight and expense, the containers are usually designed with very thin walls and a structure that is just sufficient to avoid damage to the container during transport. The container is not designed to withstand stress imposed during the emptying operation and the high pressure developed during an emptying operation can easily burst a container structure.

Reinforcing split metal sleeves or half-shells can be placed around a container during an emptying operation. However, the mounting and closing off of the sleeves and half-shells can be very complicated operations, requiring considerable manual labor. Another disadvantage is that the sleeves or half-shells must be adapted in an exact manner to the outside container dimensions thus sometimes requiring an inventory of sleeves or half-shells to accommodate various sized containers.

Accordingly, there is a need to facilitate the removal of a viscous feed material from a container, particularly removal of a viscous feed material such a viscous silicone from a delivery container such as a drum.

BRIEF DESCRIPTION OF THE INVENTION

The invention provides an improved viscous material container evacuator and method to remove viscous material from a delivery container to a processing system. The invention is describable as a viscous material container evacuator, comprising: a chamber to hold a container and a plunger axially and slidably accommodated within the chamber to express material from the container; at least one hinged closure that closes to define the chamber and to securely enclose the container; and at least one motor activated fastener that secures the closure around the container.

In an embodiment, the invention is a method to secure a closure of a viscous material container evacuator, comprising: activating a motor drive shaft to drive a connected threaded shaft into a complimentary threaded channel of a clamp block that comprises an opposing nub wall; and driving the threaded shaft to impose the nub upon a first lug of an evacuator and to foreshorten a distance between a head of the threaded shaft and the opposing nub to impose the nub against a second lug of a closure to secure the lugs together to secure the container.

Another embodiment of the invention is viscous material processing system, comprising: a viscous material feed system comprising: a viscous material container evacuator comprising a chamber to hold a container and a plunger axially and slidably accommodated within the chamber to express material from a container held within the evacuator chamber and enclosable by hinged closures that define the chamber, the closures securable by at least one motor activated fastener that secures the closure around the container; and a viscous material compounding system that receives material expressed from the feed system.

Another embodiment is a viscous material feed system, comprising: a container evacuator comprising a chamber to hold a container and a plunger axially and slidably accommodated within the chamber to express material from the container held within the evacuator chamber; and at least one hinged closure that closes to define the chamber and to securely enclose the container; and at least one motor activated fastener that secures the closure around the container; a feed tube that receives material expressed from a container by the container evacuator; and a cutting apparatus that meters material from the feed tube to a processing system.

And, another embodiment is a viscous material feed method, comprising: placing a viscous silicone gum containing drum into a material extracting apparatus; securing closure of the material extracting apparatus around the drum by activating a motor drive shaft to drive a connected threaded shaft into a complimentary threaded channel of a clamp block that comprises an opposing nub wall; and driving the threaded shaft to impose upon a first lug of closure of the apparatus and to foreshorten a distance between a head of the threaded shaft and the opposing nub to impose the nub against a second lug of a closure of the apparatus to secure the lugs together; and evacuating viscous material from the drum by driving a plunger through the drum to express the silicone gum a viscous material compounding process.

Another embodiment is a viscous material container evacuator, comprising: a chamber to hold a container and a plunger axially and slidably accommodated within the chamber to express material from the container; at least one hinged closure that closes to define the chamber and to securely enclose the container; at least one motor activated fastener that secures the closure around the container; and a hydraulic system that powers the motor, comprising a hydraulic pressure supply, and a relief cartridge that controls the pressure supply to activate the motor by diverting pressure supply from the motor when a set point pressure is attained.

And, another embodiment is a method of controlling a battery of hydraulically operated fasteners to a viscous material container evacuator, comprising: setting a set point pressure for each fastener of the battery; supplying an activating hydraulic fluid pressure to each fastener; and diverting the applied pressure from each fastener as the set point for that fastener is attained.

BRIEF DESCRIPTION OF THE DRAWING

FIG. 13 is a partially cut away elevation view of a hydraulic motor; and

FIG. 14 is a diagram of fastener hydraulics.

DETAILED DESCRIPTION OF THE INVENTION

Figure 1:
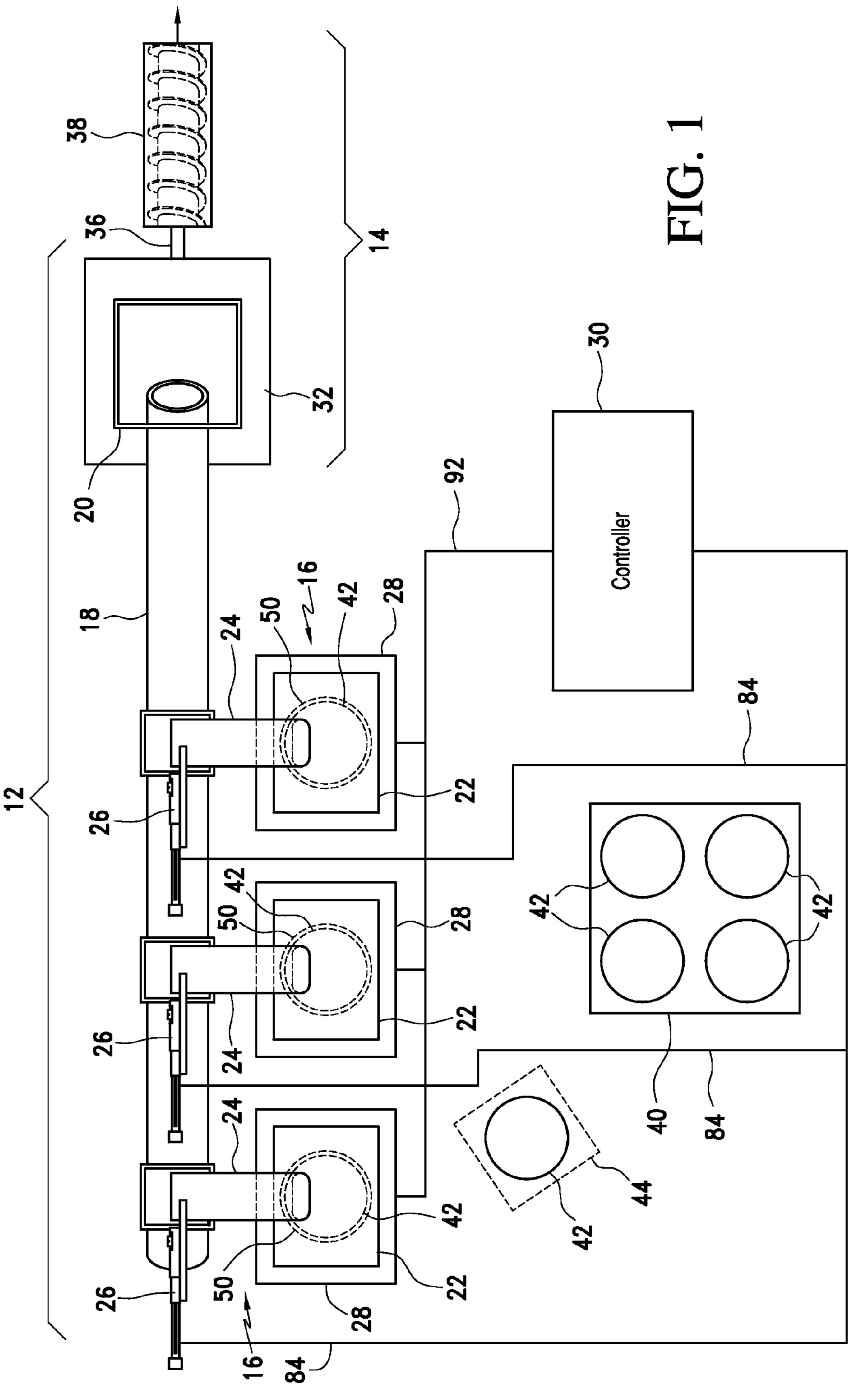
FIG. 1, FIG. 2 and FIG. 3 are schematic representations of a material processing system.

The invention relates to the handling of a viscous material such as a silicone gum. "Silicone gum" includes a viscous silicone or polysiloxane or organopolysiloxane that has the chemical formula $[R_2SiO]_n$, where R=organic groups such as methyl, ethyl, and phenyl. These materials typically comprise an inorganic silicon-oxygen backbone ( . . . —Si—O—Si—O—Si—O— . . . ) with attached organic side groups, which can be four-coordinate. In some cases organic side groups can be used to link two or more of these —Si—O— backbones together.

By varying the —Si—O— chain lengths, side groups, and crosslinking, silicones can be synthesized with a wide variety of properties and compositions. They can vary in consistency from liquid to gel to rubber to hard plastic. Silicone rubber or silicone gum is a silicone elastomer, typically having high temperature properties. Silicone rubber offers resistance to extreme temperatures, being able to operate normally from minus 100° C. to plus 500° C. In such conditions tensile strength, elongation, tear strength and compression set can be superior to conventional rubbers.

A silicone gum can be extruded or molded into custom shapes and designs such as tubes, strips, solid cord or custom profiles within size restrictions specified by a manufacturer. Cord can be joined to make "O" Rings and extruded profiles can also be joined to make up seals.

It is desirable to provide a viscous feed system that accurately and efficiently processes viscous materials such as silicone gum for use in various applications. However, these materials can be highly resistant to flow, highly adhering, highly cohering, and/or shear thickening and consequently difficult to handle. Accuracy of a packaging process and/or accuracy of a process of obtaining a defined quantity of such material, for example in a continuous process is costly when substantial time is required for cutting or separating of a quantity of the material from a larger quantity. Also, it is costly and wasteful to have to clean processing equipment on a frequent basis when the fluid material sticks to a cutting tool or instrument; also, it is costly, and disadvantageous when an incorrect amount of material is used in a downstream process.

A material evacuation process exerts substantial force against a container wall to threaten rupture of the container. Both the evacuator and any fastener to the evacuator closures must be robustly capable of securing closure against the substantial force. The invention provides a secure closure with a fastener that can with stand high forces exerted on a container wall during material evacuation. The fastener can include a hydraulic motor that drives a lock mechanism that includes a threaded shaft and a clamp block with a nub and a threaded channel that accepts the threaded shaft. The motor drives the threaded shaft to foreshorten the distance between a first closure lug and a lug on a second closure or on the evacuator wall to enclose the container for evacuation. Also, an embodiment of the fastener addresses problems of misalignment between the drive shaft and threaded shaft that arise on account of part tolerance divergence and operational wear.

In this application, the term "play" means movement or space for movement, as of mechanical parts. A degree of play means a tolerance that permits relative movement between parts without disengagement. A reference to "back" means left on a drawing or drawings and a reference to "forward" means right on the drawing or drawings.

Features of the invention will become apparent from the drawings and following detailed discussion, which by way of example without limitation describe preferred embodiments of the invention.

Figure 2:
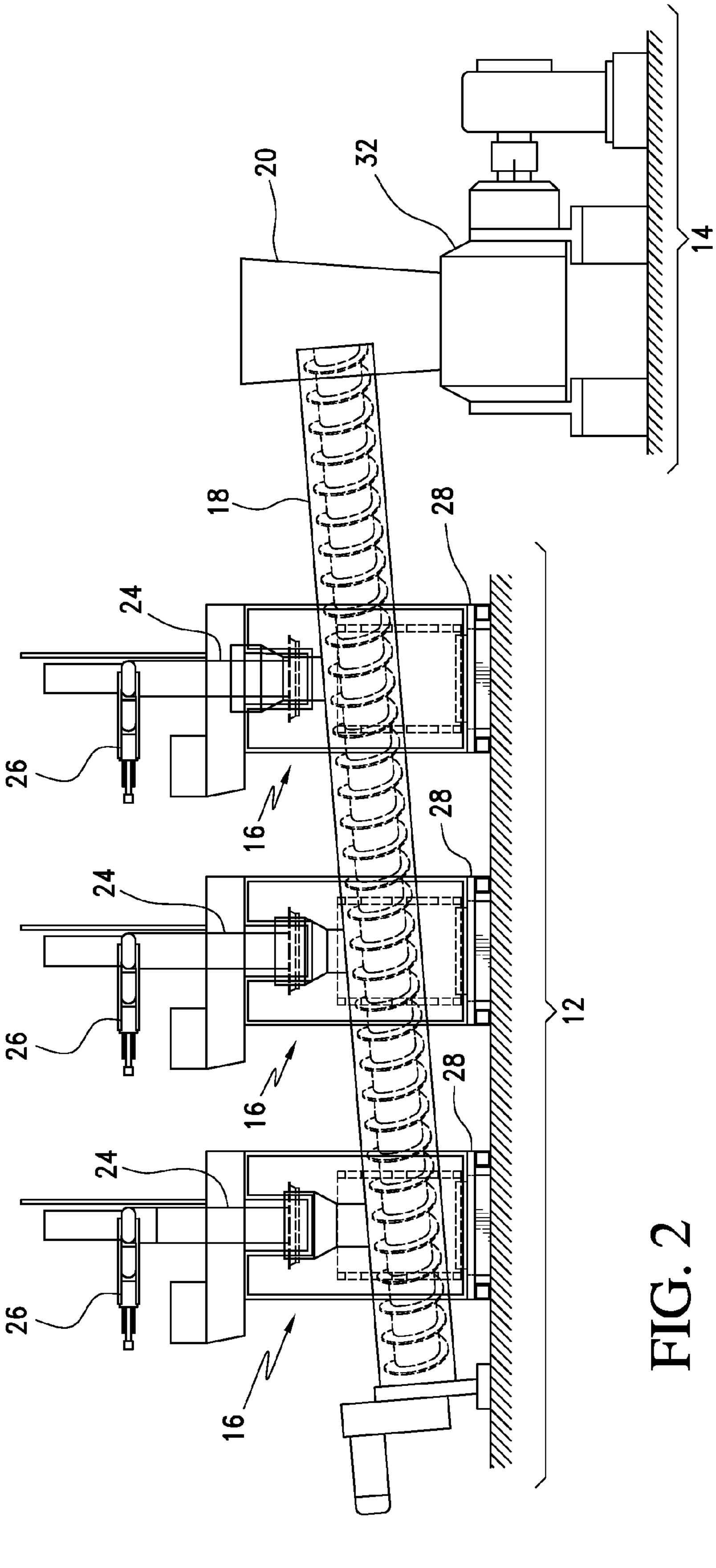
Figure 6:
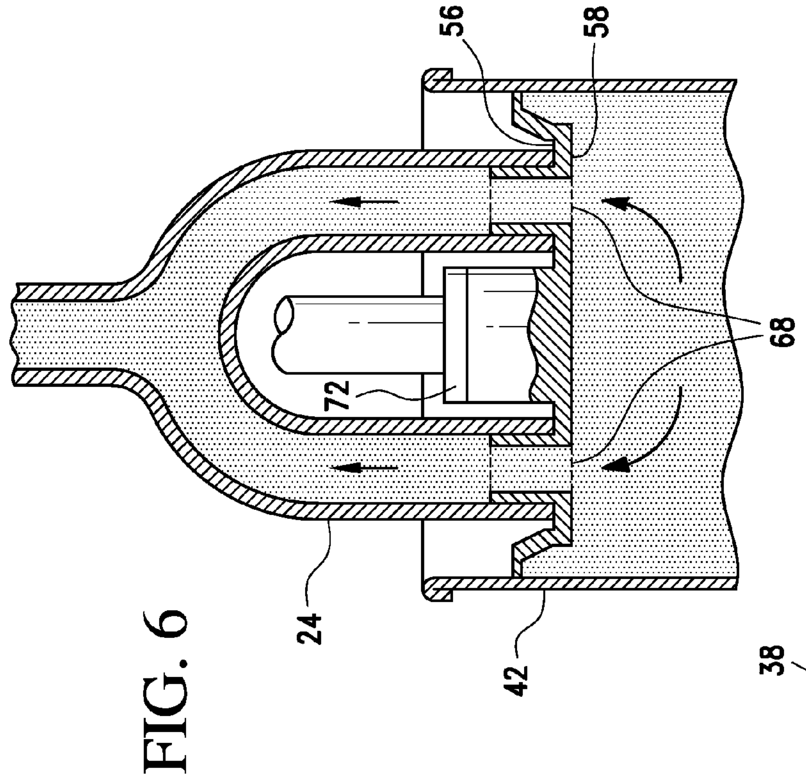
FIG. 6 is a cut away view of a section of a drum press.
Figure 3:
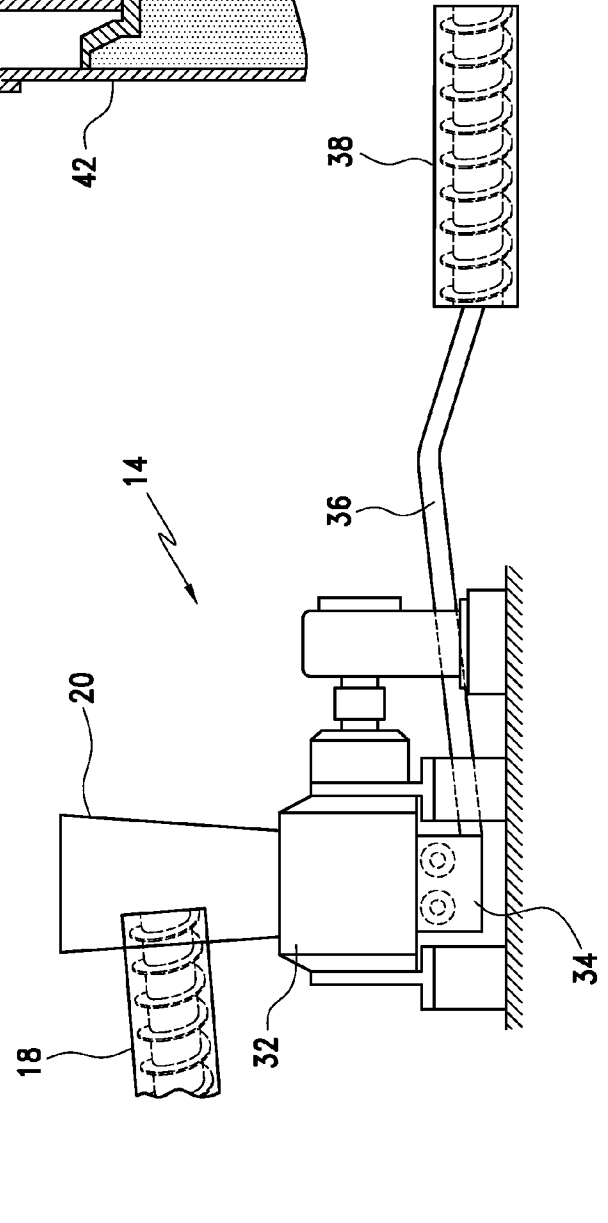
Figure 4:
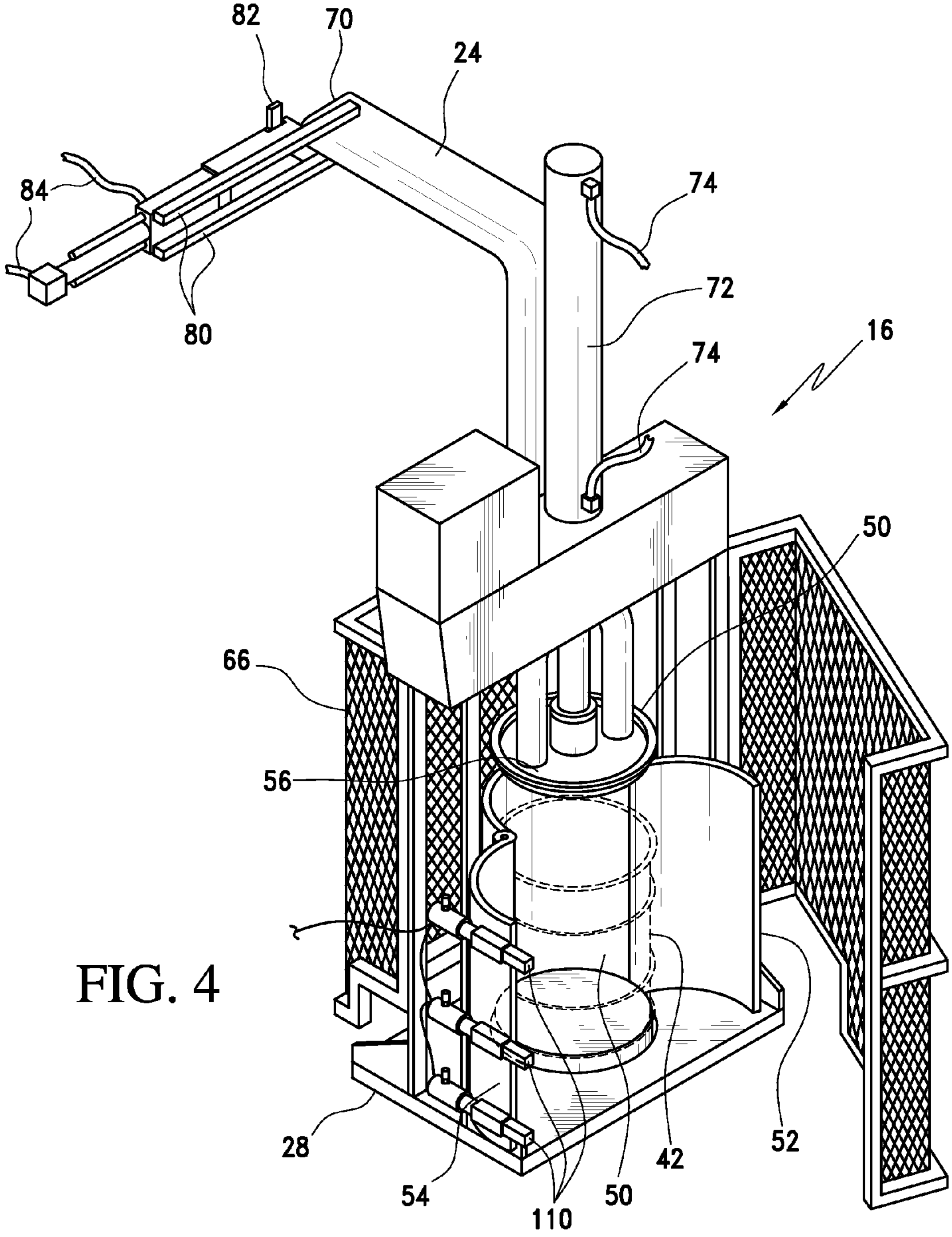
FIG. 4 and FIG. 5 are perspective views of a drum press.
Figure 5:
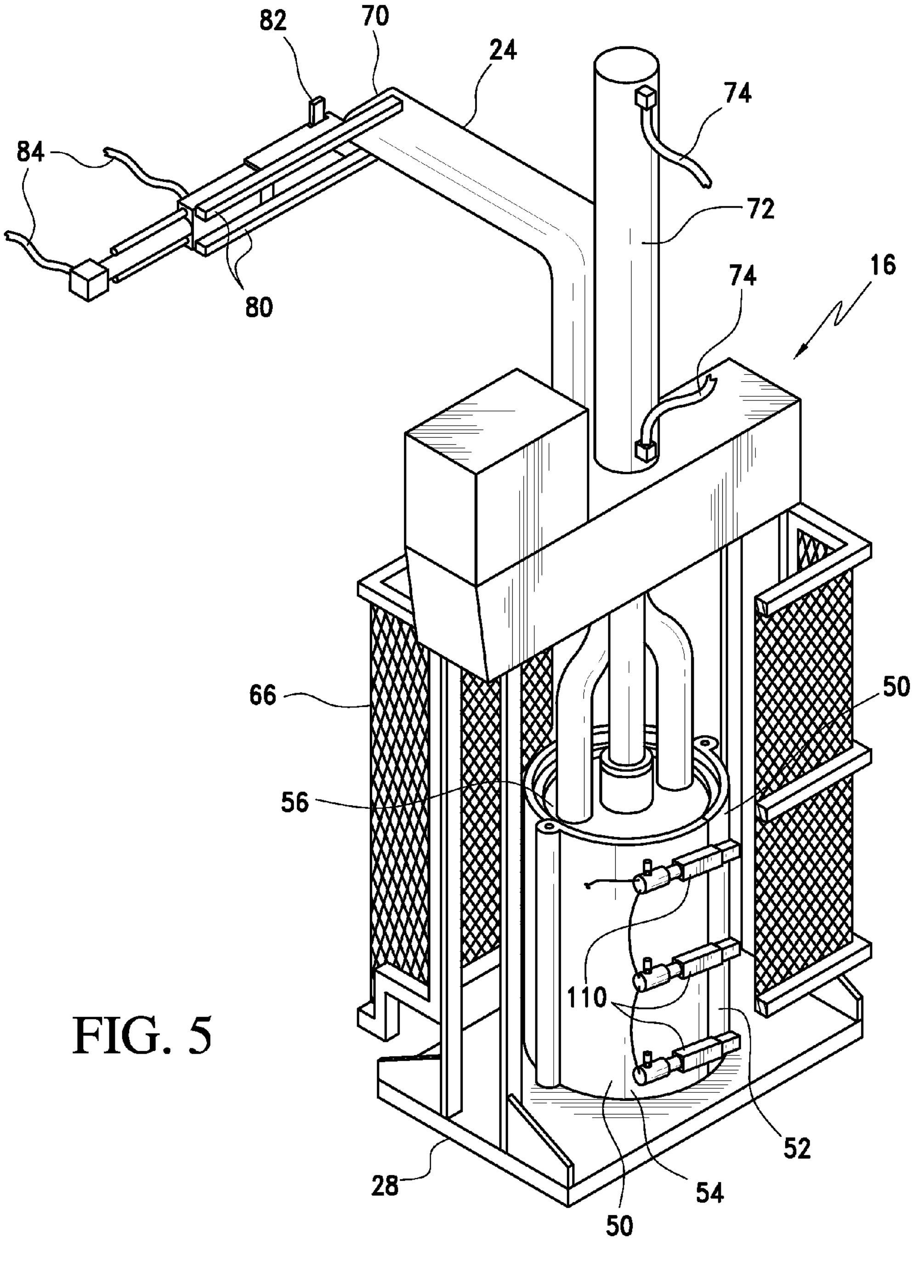

A preferred invention embodiment shown in the drawings illustrates the invention as a process to compound silicone gum into a base for forming articles. In the drawings, FIG. 1 is a schematic top view representation and FIG. 2 is a schematic side view representation of a material processing system 10 showing an integrated feed system 12 and compounding system 14. The feed system 12 includes a material extracting apparatus (MEA) 16, conveyor 18 and chute 20. FIG. 4 and FIG. 5 are elevation views of the MEA 16 and FIG. 6 is a cut away side sectional view of a section of the MEA 16. The MEA 16 includes container evacuator 22, feed tube 24, cutting apparatus 26 and floor scale 28. The integrated feed system 12 is controllably connected to controller 30. FIG. 6 is a schematic side view of compounding system 14. As shown in FIG. 1, FIG. 2 and FIG. 3, compounding system 14 includes mixer 32, roll mill 34, conveyor belt 36 and compounder 38.

The MEA 16 serves to express the viscous material from a container to the compounding system 14. In typical operations, 55-gallon steel drums from a pallet are dumped into totes and the totes (approx. 80 pounds each) are dumped into a Banbury mixer. However, manually maneuvering drums from pallets can cause back and shoulder strains and injuries. In a preferred compounding operation of the invention with respect to FIG. 1, FIG. 2 and FIG. 3, operation commences with delivery of a pallet 40 of four drums 42 of gum. While the container can be any material holding enclosure, the drawings embodiment is a feed system including a method of evacuating a silicone gum-containing drum. A suitable drum 42 in the embodiment, has full openable ends and has a cylindrical wall of steel, fiberboard or other material structure for transporting a silicone gum material. The drum 42 has opposite ends, each of which is openable to accommodate a movable plunger at one end as hereinafter described.

The material in the drums 42 may be identical or it may be of a variety of physical properties such as viscosity. The drums 42 are removed from the pallet 40 one by one by drum hauler 44 such as from Easy Lift Equipment Co., Inc., 2 Mill Park Court, Newark, Delaware 19713. The lid of each of three drums 42 is removed and each of the drums 42 is loaded by the hauler 44 into a respective container evacuator 42, which may be a Schwerdtel S 6-F drum press. Use of the drum hauler 44 eliminates ergonomic risks associated with lifting and handling the heavy drums 42. The silicone gum is then forced from each drum in measured aliquots by the MEA 16 into the conveyor 18. In the drawings embodiment, the MEA 16 comprises a container evacuator 22, feed tube 24 and cutting apparatus 26. The container evacuator 22 can be a drum press, which is a device that evacuates viscous or compacted contents from a drum. As illustrated in FIG. 4 and FIG. 5, the container evacuator 22 is a press that comprises a substantially cylindrical chamber 50 with hinged closures 52 and 54 for securing a drum 42 removably within the chamber 50. The chamber 50 and hinged closures 52 and 54 securely cradle the drum 42 during a material extracting operation. A disc-shaped platen 56 fits into the chamber 50 with a flat driving surface 58 oriented perpendiculars to the longitudinal axis of the chamber 50 and correspondingly perpendicular to the longitudinal axis of a drum 42 held within the chamber 50.

The operation of feed system 12 can be described with reference to FIG. 1, FIG. 2, FIG. 4, FIG. 5 and FIG. 6. In operation, the press closures 52 and 54 are manually unlatched by activating fasteners 110 and opening closures 52 and 54. The drum hauler 44 is used to load a first drum 42 into the press cavity 60. The press closures 52 and 54 take pressure of the hydraulic system from a drum 42 that may be thin-walled. The closures 52 and 54 are secured by a plurality of fasteners 110, which are described in detail with reference to FIGS. 7 to 10.

Figure 7:
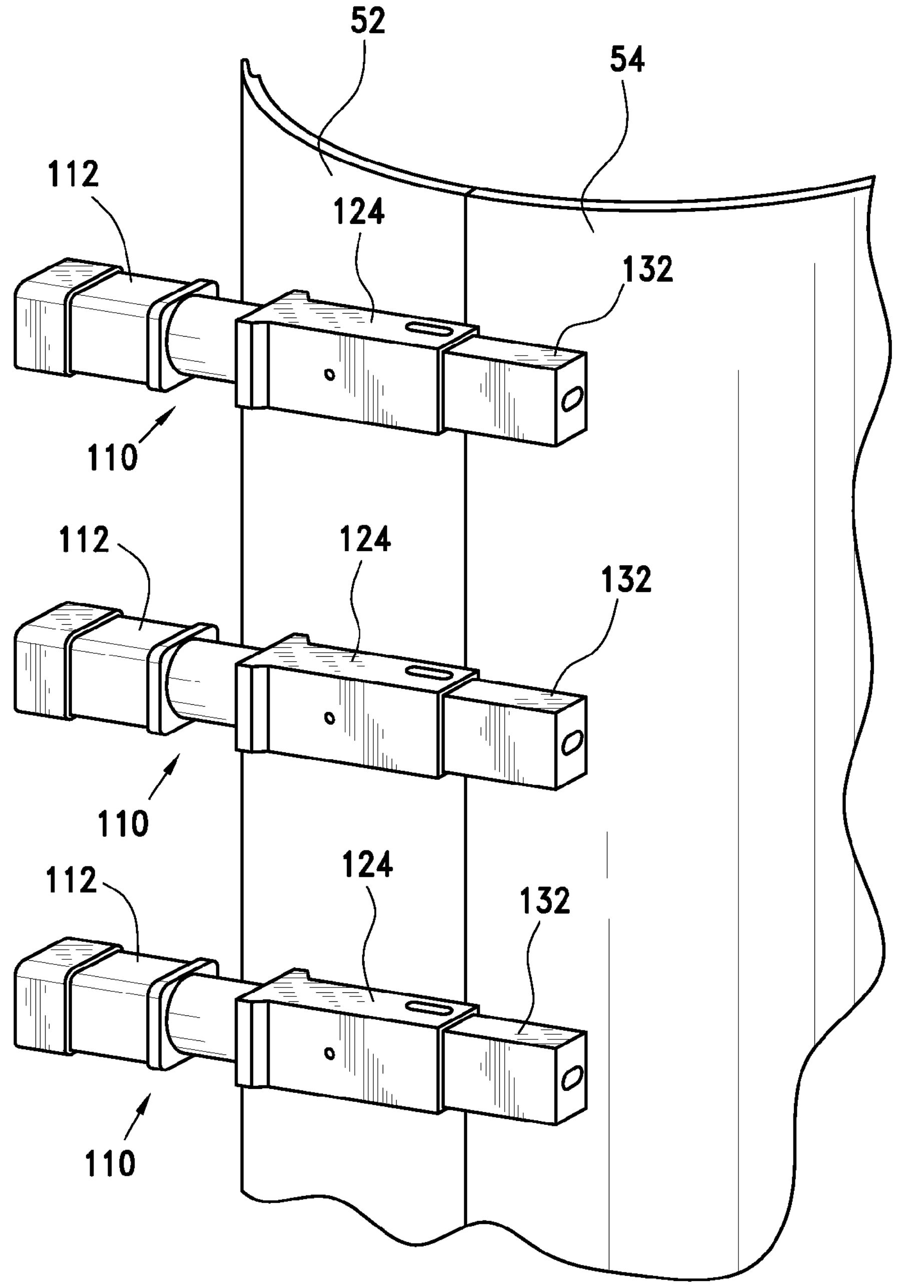
FIG. 7 is a perspective view of a hinged closure with closure door fasteners.
Figure 8:
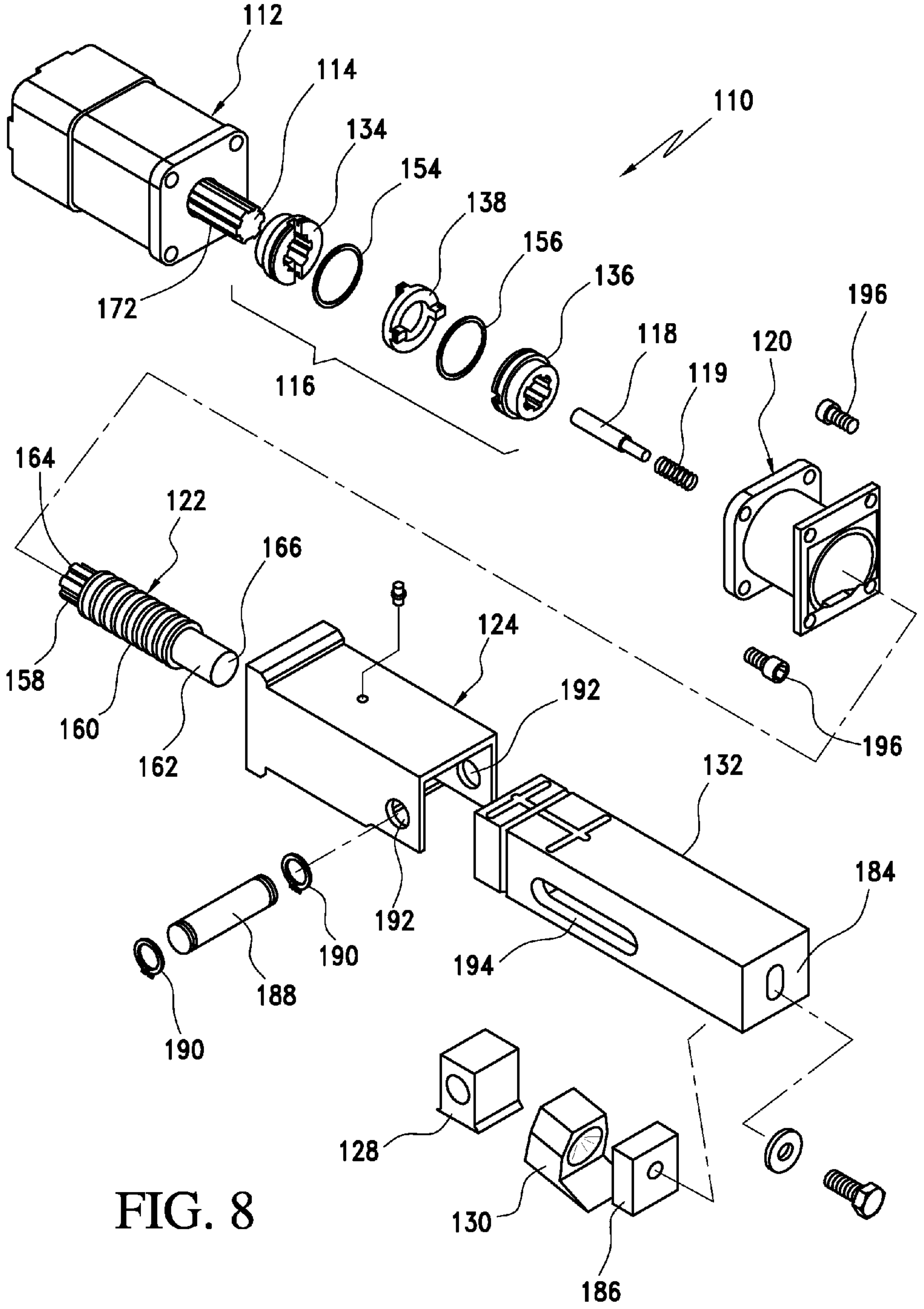
FIG. 8 is an exploded view of a fastener and hydraulic motor.
Figure 10:
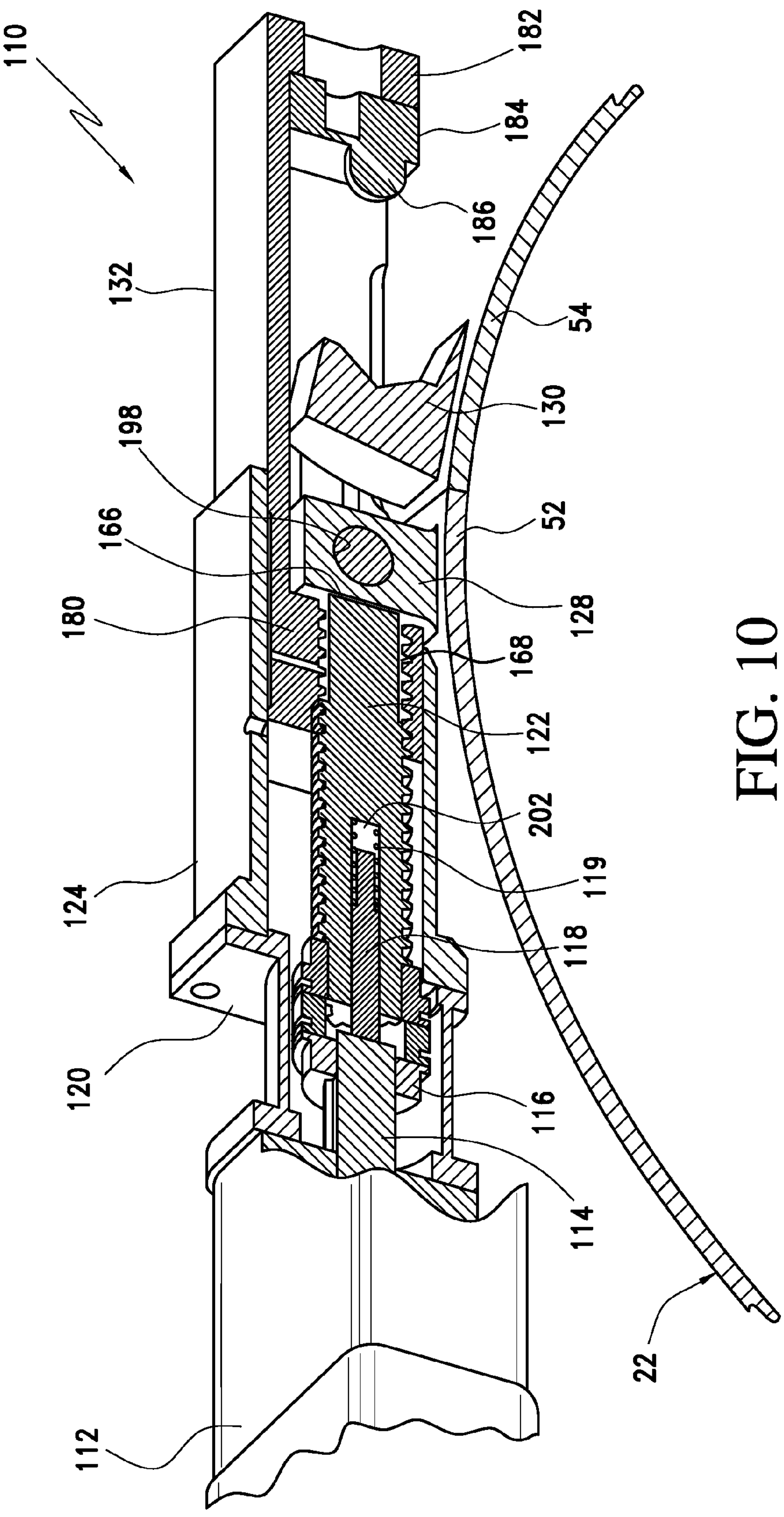
FIG. 10 is a schematic perspective cut away view of an open fastener.
Figure 11:
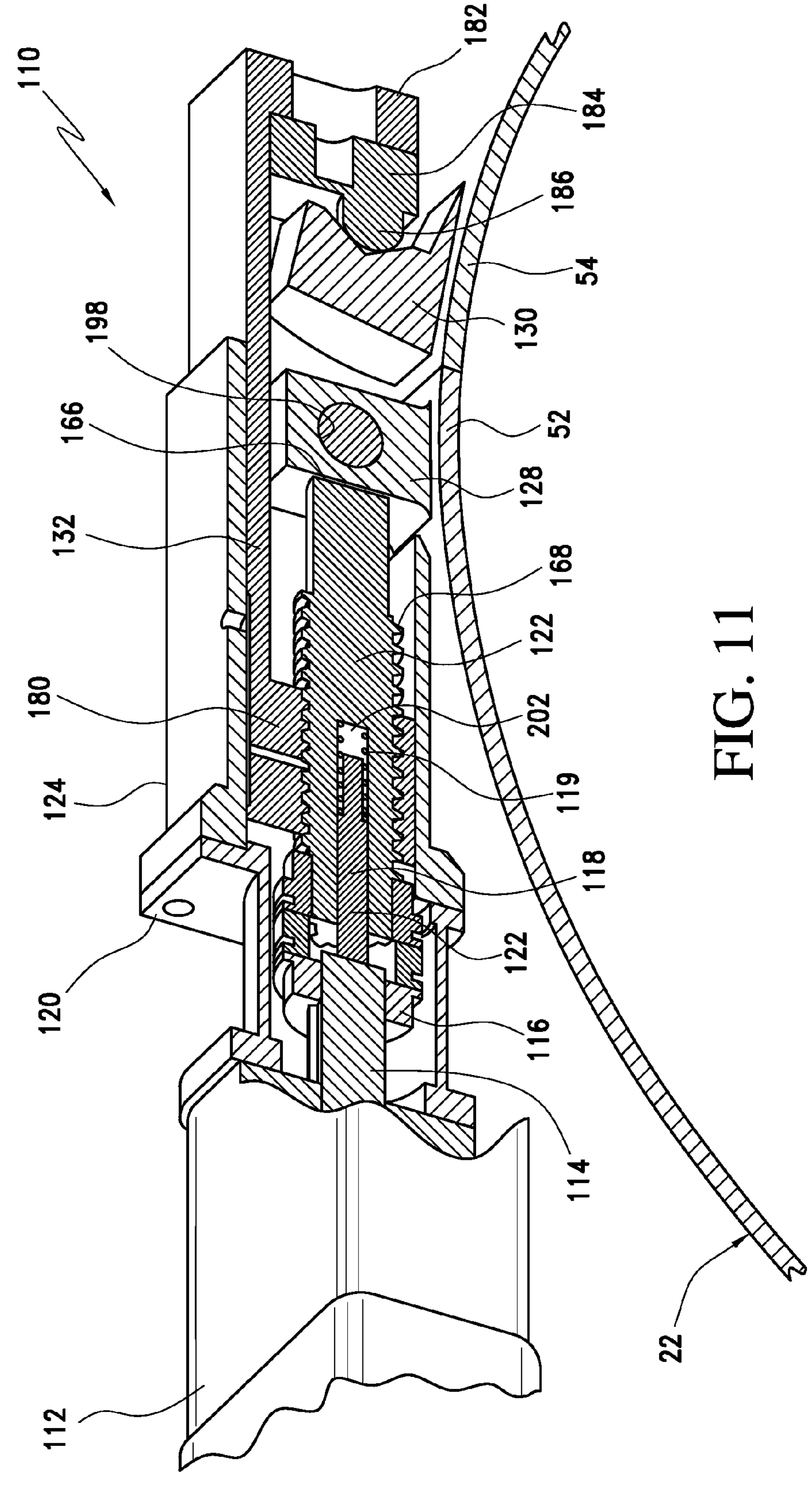
FIG. 11 and FIG. 12 are cut away views of a closed fastener and a fastener in an overrun condition.

FIG. 7 is a perspective view of hinged closures 52 and 54 secured with fasteners 110. The fasteners 110 serve to clamp and align the hinged closures 52 and 54 as described hereinafter. FIG. 8 is an exploded perspective view of one fastener 110 includes hydraulic motor 112 with drive shaft 114. From left back to front forward, fastener 110 comprises misalignment coupling 116, restart spring pin 118, restart spring 119, drive tube 120, threaded shaft 122, drive housing 124, snap pin 126 and clamp block 132. Threaded shaft 122 has a splined reduced diameter back section 158, a threaded middle section 160 and a forward reduced diameter plane section 162. A back face 164 is directed toward the drive shaft 114 and a forward face 166 is directed toward a threaded channel 168 of clamp block 132. FIG. 10 and FIG. 11 show lugs 128 and 130 as respective sections of hinged closures 52 and 54.

Figure 9:
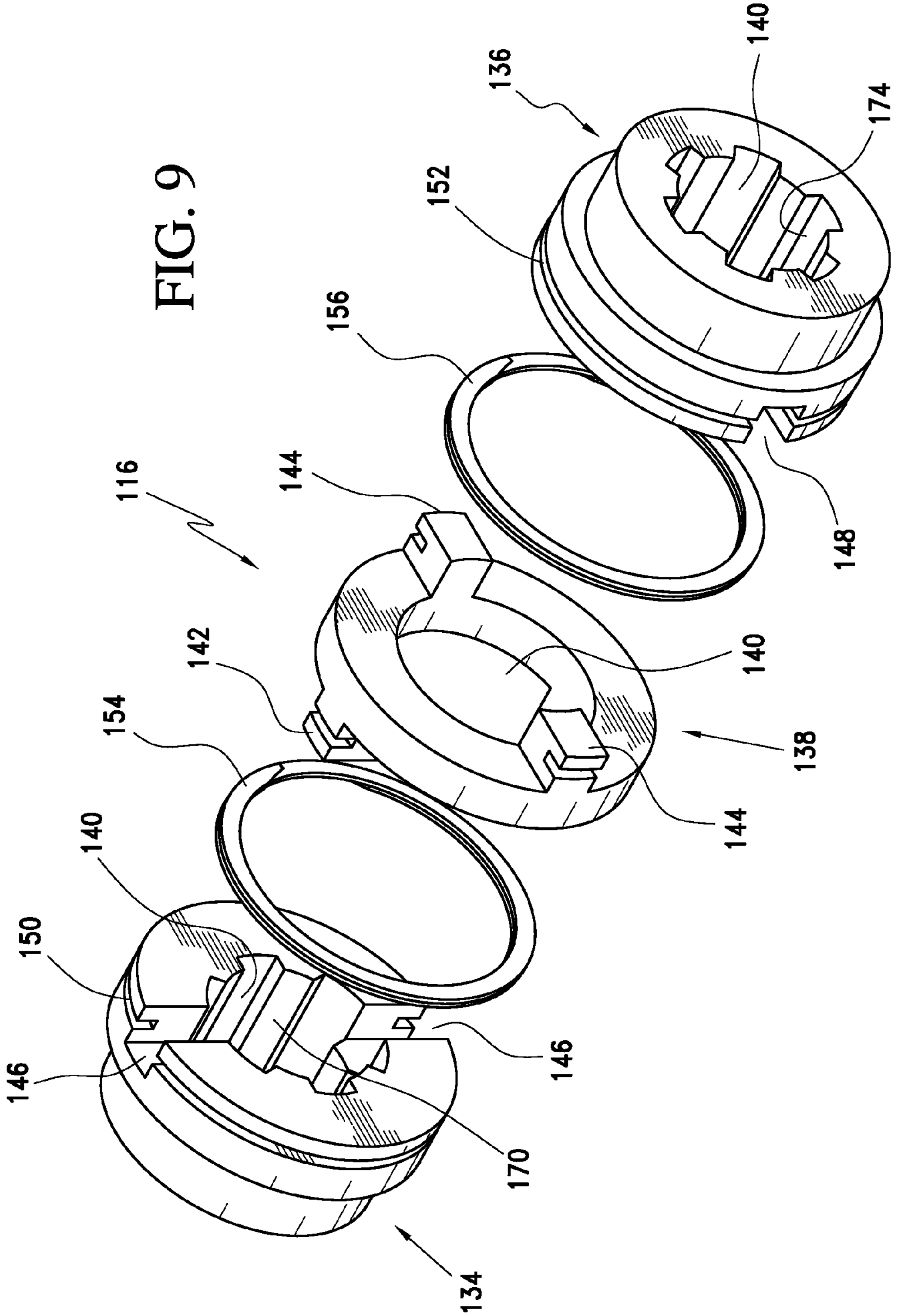
FIG. 9 is an exploded view of a misalignment coupling.

Misalignment coupling 116 serves to transmit mechanical power from one rotating shaft to another where the shafts are not in exact alignment. In FIGS. 9 to 11, the misalignment coupling is shown transmitting mechanical power from drive shaft 114 to threaded shaft 122. Misalignment coupling 116 is a three section part including back couple half 134 and forward couple half 136 and coupler section 138. Each couple half 134 and 136 has a configured interior that forms a continuous passageway 140 through coupler section 138. Coupler section 138 has back keys 142 and forward keys 144 that nest respectively into complementary keyways 146 of back couple half 134 and keyways 148 of forward couple half 136. Connector 134 has retaining groove 150 and forward couple half 136 has retaining groove 152 and the couple halves 134 and 136 are retained by respective retaining rings 154 and 156. The keyways 146 and 148 with inserted keys 142 and 144 and retaining rings 154 and 156 loosely connect each couple half 134 and 136 with the coupler section 138.

Back couple half 134 interior passageway 140 has an inner cylindrical splined surface 170 adapted to receive a complementary splined surface 172 of drive shaft 114 and forward couple half 136 has a splined surface 174 adapted to receive the complementary splined surface of reduced diameter back section 158 of threaded shaft 122. The 172, 158 splined surfaces are configured and oriented to nestle within respective spline surfaces 170, 174 in an interdigitated manner. The term interdigitated means that the splines are interlaced as fingers of two hands can be joined in parallel.

Coupler section 138 interior passageway 140 portion has a smooth wall and this portion of the passageway 140 has a larger diameter than back couple half or forward couple half diameters defined by grooves of the splined surfaces 170 and 174. The coupler section 138 connects the halves 134, 136 so that the spline configurations of the halves 134, 136 are misaligned to trap the drive shaft 114 and threaded shaft 122 to one another. The keys 142 and 144 are held by rings 154 and 156 with some degree of axial play and are placed 900 out of phase to one another to provide a slackened tolerance to both axial and angular misalignment between drive shaft 114 and threaded shaft 122. The misalignment coupling 116 configuration transmits drive shaft torque while accommodating axial and angular misalignment.

Figure 12:
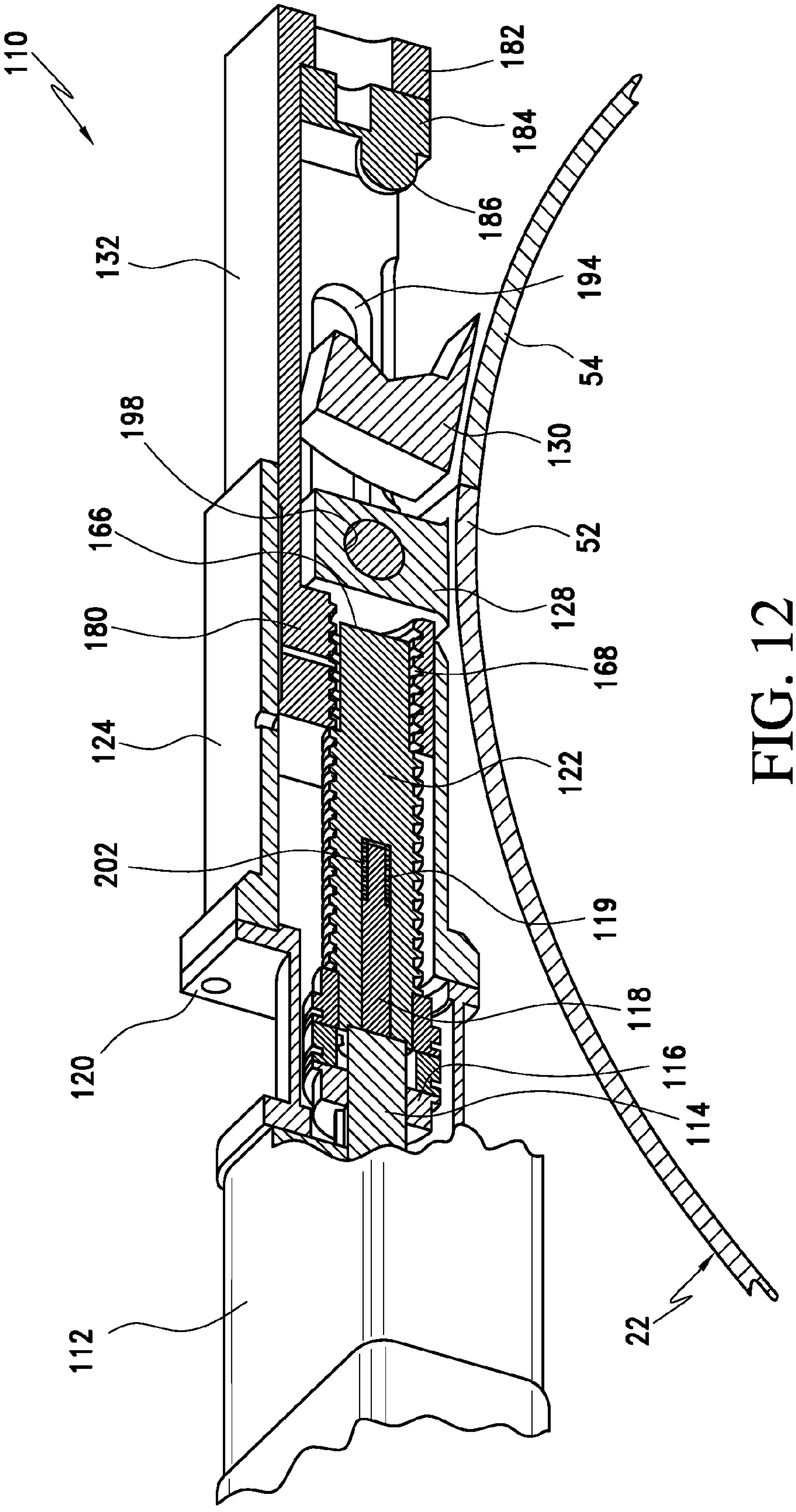

FIG. 10 is a schematic cut away view of an open fastener; FIG. 11 is a cut away side view of a closed fastener; and FIG. 12 is a schematic cut away side view of a fastener in an overrun condition. With reference to FIGS. 5 through 12, a method of securing the hinged closures 52 and 54 comprises activating hydraulic motor 112 to cause drive shaft 114 to drive connected threaded shaft 122 into complimentary threaded channel 168 of clamp block 132. Clamp block 132 is a bracket shaped piece with threaded channel 168 at a back bracket end 180 and a biasing structure shown as nub structure 184 with nub 186 at a forward bracket 182 end. In operation, the threaded shaft 122 threads through threaded channel 168 and a forward face 166 of the shaft 122 imposes upon a first lug 128 of the MEA 16. Clamp block 132 is connected with drive housing 124 via mounting pin 188 and snap rings 190 through drive housing 124 opening 192 and aligned slot 194 of clamp block 132 (and securing lug 128 through its hole 198). And, drive housing 124 is connected to the motor 122 through drive tube 120 by means of fasteners 196 (FIG. 8). So as the motor 112 advances the threaded shaft 122 the shaft 122 in turn draws clamp block 132 (via the motor 112 to drive tube 120 drive housing 124 to clamp block 132 connection) to foreshorten a distance between the nub 186 until the nub 186 imposes against lug 130 of closure 54. The nub 186 is tightened by action of the threaded shaft 122 to bind the lugs 128, 130 to form a powerful hydraulic driven closure of the MEA 16 around a drum 42 within the MEA chamber 50.

An overrun backoff mechanism is another embodiment illustrated in FIGS. 10 through 12. Restart pin 118 and a restart spring 119 are shown in FIGS. 8 and 10 through 12. FIG. 10 illustrates the open fastener 110 showing the threaded shaft 122 substantially but not completely unthreaded from threaded channel 168. The restart pin 118 and restart spring 119 are imposed into a passage 202 of the threaded shaft 122 longitudinal axis. The FIG. 10 shows the restart pin 118 biased by the drive shaft 114 against the threaded shaft 122 but with travel remaining within the passage 202. FIG. 11 shows the lock fully closed with the restart pin 118 advanced against the fully compressed restart spring 119 imposing against the threaded shaft 122 passage 118 end. The restart pin 118 pushes (biases) on the threaded shaft 122 to cause it to fully extend and to reengage the clamp block. Then in an overrun condition as shown in FIG. 12, the lead screw unthreads itself from the clamp block . . . .

Another embodiment of the invention relates to hydraulic control of the fastener 110. In FIG. 4 and FIG. 5, each hydraulic motor 112 has a relief cartridge 210 with hydraulic lines (not shown) connected to a hydraulic source (not shown). An exemplary hydraulic motor 112 with relief cartridge 210 and hydraulic line ports 212 and 214 is illustrated in FIG. 13.

FIG. 14 is a diagram of a hydraulic system 216 that includes matching cartridges 218, 220 and 222 that are associated with motors 224, 226 and 228. This configuration correlates to the three cartridges 210 and motors 112 of FIG. 4 and FIG. 5. FIG. 14 shows a four way, three position tandem spool valve 230. In an open position, hydraulic fluid flows from port P to port A and port B to port T. This results in hydraulic fluid flow from port A to port B of each motor 112. In an exemplary operation, output torque of motor 224 correlates to a differential pressure across the motor. When the differential reaches a set point, relief cartridge 218 terminates motor 224 rotation by diverting the hydraulic fluid flow through the other relief cartridges 220 and 222. Similarly, differential is sensed and flow through each respective cartridges 220 and 22 and associated motors 226 and 228 is terminated when the set point is reached. When a set point for all motors 224, 226 and 228 is reached, the three corresponding fasteners should be in an open position to permit access to the container evacuator 22. In an embodiment, the set point is stored and pressure is evaluated with a controller that may be a PLC and pressure transmitter combination (not shown).

In other terms, as hydraulic fluid flows into port B and out of port A of hydraulic motor 112 causing Lead Screw 122 to rotate unscrewing itself from Clamp Block 132. This causes clamp Block 132 to extend. Once Clamp Block 132 has extended to the point that Clamp Block 132 comes into contact with Lug 128, as illustrated in FIG. 10, Clamp Block 132 is at its end of travel and can extend no further (FIG. 10). If the hydraulic motor continues to run Lead Screw 122 will continue unscrewing itself from Clamp Block 132. With no travel left for the Clamp Block 132, Lead Screw 122 will travel toward hydraulic motor 112, compressing Restart Spring 119 between Restart Pin 118 and the bottom of hole bored in center of Lead screw 122. The threads on lead screw 122 will eventually disengage from Clamp Block 132 (FIG. 12). With the threads of the Lead Screw 122 disengaged from Clamp Block 132, continued rotation of Lead screw 122 will cause no further travel in either Lead screw 122 or Clamp Block 132.

In an overrun situation, hydraulic fluid flows into port A and out of port B of hydraulic motor 112 causing rotation of Lead Screw 122 in its tightening direction. Restart Spring 119 presses on Lead screw 122 pushing its threads into the Threaded bore of Clamp Block 132 causing the threads to reengage. Once the threads of Clamp Block 132 and Lead Screw 122 have reengaged Lead Screw 122 will travel toward Lug 128. Lead Screw 122 will come in contact with Lug 128 (FIG. 10), at this point Clamp Block 132 will begin to retract. Once the Nipple 134 comes into contact with Lug 130 the torque required to rotate the Lead Screw 122 will increase. Because the pressure differential from port A and B of Hydraulic motor 112 correlates to its output torque, the pressure drop across ports A to B of hydraulic motor 112 increases. Maximum torque is set by means of limiting the maximum hydraulic pressure drop from port A to B of hydraulic motor.

In a fastener unlocking cycle, a solenoid of the spool valve 230 directs fluid flow from port P to port B and from port A to port T resulting in hydraulic flow from port B to port A in each motor 224, 226 and 228. Flow from port B to port A actives each motor 224, 226 and 228 to open each fastener 110. When an open situation is determined by PLC timing, the PLC returns the valve 230 to neutral. In an event that a motor fails to operate when hydraulically activated, a relief valve 232 prevents pressure from increasing above a "burst pressure."

Each MEA 16 includes the container evacuator 22, feed tube 24 and cutting apparatus 26 and each is set on a respective floor scale 28. In each MEA 16, the feed tube 24 is connected through the disc shaped platen 56 to communicate with the press cavity 60. The platen 56 is driven by hydraulic plunger 72. When a batch is set up by loading each chamber 50 of the feed system 12 battery, an operator can initiate a system cycle by controller 30 touch screen located at a work station. The controller 30 can be a microprocessor or computer or the like for controlling the MEA 16 as hereinafter described.

The operator can commence system operation at controller 30. When a cycle is activated by an operator, a plunger 72 of each container evacuator 22 of the battery shown in FIG. 1 is activated via control lines 74 (FIG. 4 and FIG. 5). Then, as the screw conveyor 18 starts turning, the press platen 56 with connected feed tube 24 is forced by hydraulically driven plunger 72 to travel down into the drum 42 interior. As further illustrated in FIG. 6, as platen 56 traverses the drum 42 longitudinal axis within the press cavity 60, drum contents are displaced upward into a connecting orifice 68 of the feed tube 24. As the platen 56 completes traversing the drum axis, all material is forced upward into the feed tube 24 to be eventually expelled from the feed tube discharge port 70.

The material is cut into small pieces by cutting apparatus 26 as it exits from the discharge port 70 to the conveyor 18 to charge to compounding system 14. Cutting can be accomplished by various cutting mechanisms, including a cutting head disposed at an outlet end of the feed tube. For example, Brandl, U.S. Pat. No. 5,797,516, incorporated hereto in its entirety discloses a cutting head formed by a knife that is detachably mounted in an axial direction and radial and tangential to the axial direction. The cutting head is situated relative to a feed tube about a common central longitudinal axis.

In the FIG. 4, FIG. 5 and FIG. 6 embodiment, the MEA 16 includes a cutting apparatus 26 located at discharge port 70. The cutting apparatus 26 includes rails 80 that secure cutting wire 82 to guide the wire 82 to cut material exiting the feed tube discharge port 70. The rails 80 secure the cutting wire 82 to traverse the feed tube 24 longitudinal axis at discharge port 70 when activated by controller 30 via lines 84 and 86.

The controller 30 of FIG. 1 illustrates an embodiment of the invention. Controller 30 is responsively connected to loss of weight scales 28 via lines 92 to sense loss of weight as material is expressed from the drums 42 to conveyor 18. The controller 30 computes a weight charged of material charged to the conveyor 18 by the difference between an initial weight of the MEA 16 and initially emplaced and full drum 42. In the embodiment of the drawings, the controller 30 can sense an initial total weight of all the MEAs 16 and emplaced full drums 42 of the MEA battery of for example, the three shown in FIG. 1. The controller 30 monitors the combined weight as material in the drums is evacuated to the conveyor 18. The controller 30 contemporaneously calculates a weight of material charged to the conveyor 18 and hence to the compounding system according to a difference between the initial total weight and contemporaneously sensed total weight.

The controller 30 also controls operation of cutting apparatus 26 according to the calculated charged material weight. Initially, the cutting apparatus 26 can be programmed to make cuts of about "football" sized material, for example to fit in a 14" inner diameter screw conveyor 18. Once a piece of material is cut from the feed tube discharge port 70, floor scale 28 senses a contemporaneous weight and feeds this signal back to the controller 30. When the controller 30 senses a contemporaneous weight signal and calculates that a total charged weight is within a specified range of total material to be charged (for example within 15 pounds of "set point") to the compounding system 14, the controller can signal the cutting apparatus 26 via lines 84 to increase cut frequently to produce smaller "diced" pieces. The smaller diced pieces at approach to set point permit improved control of feed to attain a charged material weight within a prescribed tolerance range, for example +/−2 pounds for a batch.

As the drum 42 evacuation process is completed, door fasteners of the hinged closures 52 and 56 open and a controller 30 Run Screen displays "NEW DRUM." A beacon light mounted on the container evacuator 22 turns yellow, indicating the drum 42 is ready to be changed. The chamber 50 hinged closures 52 and 56 open the hydraulic unit motor terminates. The door fasteners are opened and the empty drum is removed, typically with the drum hauler. The press is reloaded with a drum the process repeated.

As material is charged from the presses to the screw conveyor, the conveyor is turning at low rpms to feed the material to the mixer. The screw is programmed to stop turning 90 seconds after the last press makes its last cut. We have determined this time to be adequate to clear all material from the conveyor.

Conveyor 18 transports and drops the silicone gum to chute 20, which drops the material into a material compounding system 14. In one silicone compounding process, a heat cured rubber (HCR) composition can be produced by kneading a high-viscosity polydiorganosiloxane, an inorganic filler and additives by means of a batch kneading machine such as the high intensity Banbury mixer 32 or a low intensity double arm dough mixer. In this process, silicone gum, inorganic filler, treating agents and additives are batch mixed until desired properties are obtained. In Kasahara et al., U.S. Pat. No. 5,198,171, a preconcentrate of silicone gum, inorganic filler and treating agents is formed by a high speed mechanical shearing mixer. The resulting premix is further compounded in a same-direction double screw extruder. A premix is formed in a first step wherein a silicone gum having a viscosity at 25° C. of $1\times10^5$ cP or more, an inorganic filler and a treating agent are mixed in a high speed mechanical shearing machine to provide a flowable particulate mixture in which each ingredient is present in a substantially uniform, finely dispersed state. The flowable particulate mixture is then fed at a constant feed rate into a kneading and extruding machine that has two screws rotating in the same direction.

As the material exits from the end of the conveyor, it falls into a chute. It tumbles down the chute directly into the mixing chamber of a Banbury mixer where feed is mixed with filler and additives. In the FIGS. 1, 2 and 3 embodiment, the silicone gum drops through chute 20 to compounding system 14, which includes mixer 32 such as a Banbury, roll mill 34, conveyor belt 36 and compounder 38. The material dropped from chute 20 may be a feed of silicone gums of varying physical properties such as varying viscosity.

In the mixer 32 such as a Bepex Turbolizer, fumed silica, the silicone gum and a treating agent can be added to form a densified polymer/filler mass. After the gum feed is mixed it is dropped into the nip 46 of roll mill 34 where the material is rolled into a strip form. After a drop, a programmed logic controller (PLC) verifies that the mixer drop door has opened, then reclosed and is ready for feed. For any residual material that hangs in the chute, the "pusher" is programmed to sweep a few seconds after the conveyor stops. This serves to scrape down the chute, and ensure all material gets into the mixer to correctly formulate the batch.

The mill imparts a final mix to fully incorporate filler and to cool material. Then, the material is stripped from the mill a strip form. The strip form is fed by means of conveyor belt 36 into compounder 38, which may be an extruder. The compounder 38 serves to clean and form the material for packaging. The material can be packaged and boxed through an automated cut, weigh and packaging system.

The feed system and method of the invention can be used in conjunction with a process to compound a silicone rubber into a base for sealing compounds with additives such as pigments dosed to the rubber in appropriate quantities and mixed in large mixers or extruders. FIG. 1 illustrates an exemplary process wherein a filler such as fumed silica is continuously treated and compounded with a silicone polymer such as a vinyl-terminated polydimethylsiloxane.

A heat cured rubber (HCR) comprises a high viscosity silicone polymer, an inorganic filler and various additives that aid processing or impart desired final properties to the composition. A vulcanizing agent or catalyst can be added and the composition heat cured to fabricate silicone rubber moldings such as gaskets, medical tubing and computer keypads. An HCR composition can be produced by kneading a high-viscosity polydiorganosiloxane, the inorganic filler and additives by means of a batch kneading machine such as a high intensity Banbury mixer or a low intensity double arm dough mixer. In this process, polydiorganosiloxane, inorganic filler, treating agents and additives are batch mixed until desired properties are obtained. In Kasahara et al., U.S. Pat. No. 5,198,171, a preconcentrate of polydiorganosiloxane, inorganic filler and treating agents is formed by a high speed mechanical shearing mixer. The resulting premix is further compounded in a same-direction double screw extruder. The premix is formed in a first step wherein a diorganopolysiloxane having a viscosity at 25° C. of $1\times10^5$ cP or more, an inorganic filler and a treating agent are mixed in a high speed mechanical shearing machine to provide a flowable particulate mixture in which each ingredient is present in a substantially uniform, finely dispersed state. The flowable particulate mixture is then fed at a constant feed rate into a kneading and extruding machine that has two screws rotating in the same direction.

The following Example is illustrative and should not be construed as a limitation on the scope of the claims.

EXAMPLE

This EXAMPLE is a combined description of press experiments at Schwerdtel US headquarters (New Jersey), ProSys Corporation (Missouri), and at GE Silicones Waterford, N.Y. Experiments on the shaftless screw conveyor were conducted at GE Silicones Waterford using Martin Sprocket equipment.

A viscous material feed system as schematically illustrated in the drawings included a Schwerdtel S 6-F drum press mounted to Vishay BLH floor scale that measured material flow according to loss of weight. The Schwerdtel S 6-F press included a hydraulic pressure driven cylinder and platen that drives a platen into the 55 gallon drum.

The feed system included a feed tube to receive material expressed from a drum by the press and a pneumatic solenoid operated cutting system that metered material from the feed tube to a 12"×24' shaftless screw conveyor according to loss of weight sensed by the scale. The screw conveyor interfaced to a chute. The chute permitted material to fall via gravity directly to a Banbury mixer. Material remaining in the chute was cleared by a pneumatic pusher prior to each mix (GE design and fabrication). The system was controlled by operators at two (2) QuickPanel LM90 touch screens.

In operation, an operator first entered set points into a system controller. One set point represented a target batch of silicone gum to be charged to a Banbury mixer, which was part of a silicone gum compounding system. A pallet of four (4) fifty-five (55) gallon drums of polymer (Viscosity Range 150,000 to 900,000 Poise) was placed on the drum carousel. The 55-gallon straight-sided steel drums were delivered by the carousel and one drum was loaded into the Schwerdtel S 6-F drum press using an Easy Lift Equipment Drum Hauler unit. The Schwerdtel S 6-F drum press was controlled by a GE Fanuc 90/30 PLC. Material was displaced, from the drum to the feed tube by the hydraulic Schwerdtel gum press.

The operator pressed a START OR RESTRT BATCH button of the controller to commence operation. The press doors were secured by hydraulically driven fasteners. Then, as the screw conveyor started turning, the hydraulically driven press platen commenced traveling down into the drum. As platen traversed the drum, drum contents were squeezed upward into the feed tube. As the platen completed traversing the drum axis, all material was forced upward into the feed tube. As material exited the feed tube, a pneumatic solenoid operated cutting system diced the material into pieces that then fell into a 12"×24' shaftless screw conveyor to charge to a Banbury mixer.

A batch of material flow from conveyor to the Banbury mixer was measured by loss of weight detected by the Vishay BLH load cells. A combined weight of presses, feed tubes, cutting mechanisms and material-containing drums was registered by the control system as a first weight. The control system monitored a charged weight of silicone gum to the Banbury by registering progressing weight as silicone gum was pressed from the drums and expelled through the feed tubes and cutting systems. The control system displayed a differential between the first weight and registered progressive weights that represented a charged silicone gum weight.

A system operator observed the differential weight and terminated the batch operation when the differential weight registered within a ±2 pound range of the set point, the pneumatic solenoid operated cutting system rate was increased to dice smaller aliquots of exiting material. The batch feed operation was terminated by the operator when the control system registered a charged silicone gum weight with 2 pounds of the set point.

The EXAMPLE illustrates control of material charge to a compounding system according to a feed system of the invention.

The invention includes changes and alterations that fall within the purview of the following claims. The foregoing examples are merely illustrative of the invention, serving to illustrate only some of the features of the present invention. For example, the invention includes a controller with a set of instructions: to refer to a look-up data base to determine a set point for a material to be charged to a compounding system; sensing an initial combined weight of a material extracting apparatus and a container with material; signaling commencement of the material extracting apparatus operation to evacuate the material from the container; sensing a progressing combined weight of the material extracting apparatus and the container with material; calculating a charged material weight according to a difference between the initial combined weight and the sensed progressing combined weight; and terminating the material extracting apparatus operation when a calculated charged material weight is within a specified range of the set point.

The appended claims are intended to claim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention.

As used in the claims, the word "comprises" and its grammatical variants logically also subtend and include phrases of varying and differing extent such as for example, but not limited thereto, "consisting essentially of" and "consisting of."

Where necessary, ranges have been Supplied, those ranges are inclusive of all sub-ranges there between. Such ranges may be viewed as a Markush group or groups consisting of differing pairwise numerical limitations which group or groups is or are fully defined by its lower and upper bounds, increasing in a regular fashion numerically from lower bounds to upper bounds. It is to be expected that variations in these ranges will suggest themselves to a practitioner having ordinary skill in the art and where not already dedicated to the public, those variations should where possible be construed to be covered by the appended claims.

It is also anticipated that advances in science and technology will make equivalents and substitutions possible that are not now contemplated by reason of the imprecision of language and these variations should also be construed where possible to be covered by the appended claims.

All United States patents (and patent applications) referenced herein are herewith and hereby specifically incorporated by reference in their entirety as though set forth in full.

The invention includes changes and alterations that fall within the purview of the following claims.

What is claimed is:

1. A viscous material container evacuator, comprising:

a chamber to hold a container and a plunger axially and slidably accommodated within the chamber to express material from the container;

at least one hinged closure that closes to define the chamber and to securely enclose the container; and at least one motor activated fastener that secures the closure around the container, the motor activated fastener comprises a hydraulic motor that drives a threaded shaft into a threaded channel of a clamp block, foreshortening a spacing between a forward face of the threaded shaft and an opposing clamp block nub, driving lugs together on opposing hinged closures of the at least one hinged closure to close the closures.

2. The viscous material container evacuator of claim 1, wherein the motor activated fastener comprises a hydraulic motor drive shaft and a misalignment coupling comprising a back couple half and a forward couple half and an intermediate coupler section connecting the back and forward halves with axial and angular play to accommodate misalignment between the drive shaft and the threaded shaft.

3. The viscous material container evacuator of claim 1, wherein the motor activated fastener comprises a hydraulic motor drive shaft and a misalignment coupling comprising a back couple half and a forward couple half and an intermediate coupler section connecting the back and forward halves to accommodate misalignment between the drive shaft and the threaded shaft, wherein each couple half and has an interior that forms a passageway with the coupler through coupling and the back couple half has an interior passageway spline configuration that accommodates a complementary spline configuration of the drive shaft and the forward half has an interior passageway spline configuration that accommodates a complementary spline configuration of the threaded shaft.

4. The viscous material container evacuator of claim 1, wherein the motor activated fastener comprises a hydraulic motor drive shaft and a misalignment coupling comprising a back couple half and a forward couple half and an intermediate coupler section connecting the back and forward halves with axial and angular play to accommodate misalignment between the drive shaft and the threaded shaft, wherein the coupler has a smooth wall of a larger diameter than passageway diameters of the back couple half and forward couple half as defined by the grooves of the back couple half and forward couple half splined surfaces and the coupler section connects the halves so that the spline configurations of the halves are misaligned to trap the drive shaft and threaded shaft to one another.

5. The viscous material container evacuator of claim 1, wherein the motor activated fastener comprises a hydraulic motor drive shaft and a misalignment coupling comprising a back couple half and a forward couple half and an intermediate coupler section connecting the back and forward halves with axial and angular play to accommodate misalignment between the drive shaft and the threaded shaft, wherein the couple halves are connected to the coupler by keys and keyways to provide axial and angular misalignment tolerance between the drive shaft and the threaded shaft.

6. The viscous material container evacuator of claim 1, wherein the motor activated fastener comprises a hydraulic motor drive shaft and a misalignment coupling comprising a back couple half and a forward couple half and an intermediate coupler section connecting the back and forward halves with axial and angular play to accommodate misalignment between the drive shaft and the threaded shaft, wherein the couple halves are connected to the coupler by keys held to keyways by rings to provide axial and angular misalignment tolerance between the drive shaft and the threaded shaft.

7. The viscous material container evacuator of claim 1, wherein the motor activated fastener comprises a hydraulic motor drive shaft and a misalignment coupling comprising a back couple half and a forward couple half and an intermediate coupler section connecting the back and forward halves with axial and angular play to accommodate misalignment by transmitting drive shaft torque while accommodating axial and angular misalignment between the drive shaft and the threaded shaft.

8. The viscous material container evacuator of claim 1, wherein the container evacuator comprises a piston driven platen on said plunger that is axially and slidably accommodated within the chamber.

9. The viscous material container evacuator of claim 1, further comprising a controller that activates the plunger.

10. A viscous material processing system, comprising:

a viscous material feed system comprising:

a viscous material container evacuator comprising a chamber to hold a container, a plunger axially and slidably accommodated within the chamber to express material from the container held within the evacuator chamber and hinged closures that define the chamber, the closures securable by at least one motor activated fastener; and a viscous material compounding system that receives material expressed from the feed system and; wherein the viscous material container evacuator comprises a first lug located on the at least one of the hinged closures and a second lug located on a second hinged closure of the chamber; and the motor activated fastener that comprises: a hydraulic motor with a drive shaft operably connected to an end of a partially threaded shaft to thread the partially threaded shaft into a threaded channel of a clamp block to drive the clamp block against the first lug to close the closure against the chamber or second hinged closure of the chamber.

11. The viscous material processing system of claim 10, wherein the motor activated fastener comprises a hydraulic motor drive shaft and a misalignment coupling comprising a back couple half and a forward couple half and an intermediate coupler section connecting the back and forward halves with axial and angular play to accommodate misalignment between the drive shaft and the partially threaded shaft.

12. A viscous material feed system, comprising:

a container evacuator comprising a chamber to hold a container; a plunger axially and slidably accommodated within the chamber to express material from the container held within the evacuator chamber; at least one hinged closure that closes to define the chamber and to securely enclose the container; and at least one motor activated fastener that secures the closure around the container;

a feed tube that receives material expressed from a container by the container evacuator; and a cutting apparatus that meters material from the feed tube to a processing system; the container evacuator comprises a first lug located on one of the at least one hinged closure and a second lug located on a second hinged closure of the chamber; the motor activated fastener comprises: a hydraulic motor with a drive shaft operably connected to an end of a partially threaded shaft to thread the partially threaded shaft into a threaded channel of a clamp block to drive the clamp block against the first lug to close the closure against the second hinged closure of the chamber.

13. The viscous material feed system of claim 12, wherein the motor activated fastener comprises a misalignment coupling comprising a back couple half and a forward couple half and an intermediate coupler section connecting the back and forward halves with axial and angular play to accommodate misalignment between the drive shaft and the partially threaded shaft.

14. A viscous material feed method, comprising:

placing a viscous silicone gum containing drum into a material extracting apparatus;

securing a closure of the material extracting apparatus around the drum by activating a motor drive shaft; driving a connected threaded shaft into a complimentary threaded channel of a clamp block that comprises an opposing nub; driving the threaded shaft upon a first lug of the closure of the apparatus and foreshortening a distance between a forward face of the threaded shaft and the opposing nub to impose the nub against a second lug of the closure of the apparatus to secure the lugs together; and evacuating viscous material from the drum by driving a plunger through the drum to express the silicone gum a viscous material compounding process.

* * * * *